(12) United States Patent
Liberatore et al.

(10) Patent No.: US 11,600,837 B2
(45) Date of Patent: Mar. 7, 2023

(54) CROSSLINKED MEMBRANE FOR ANION EXCHANGE APPLICATIONS

(71) Applicant: The University of Toledo, Toledo, OH (US)

(72) Inventors: Matthew Liberatore, Toledo, OH (US); George Amobi Ozioko, Toledo, OH (US); Karl Schoeps, Toledo, OH (US)

(73) Assignee: The University of Toledo, Toledo, OH (US)

( * ) Notice: Subject to any disclaimer, the term of this patent is extended or adjusted under 35 U.S.C. 154(b) by 601 days.

(21) Appl. No.: 16/595,871

(22) Filed: Oct. 8, 2019

(65) Prior Publication Data

US 2020/0119379 A1 Apr. 16, 2020

Related U.S. Application Data

(60) Provisional application No. 62/743,724, filed on Oct. 10, 2018.

(51) Int. Cl.
| | | |
|---|---|---|
| *H01M 8/103* | (2016.01) | |
| *H01M 8/1027* | (2016.01) | |
| *H01M 8/1072* | (2016.01) | |
| *B01J 41/07* | (2017.01) | |
| *B01J 47/12* | (2017.01) | |
| *C08F 220/56* | (2006.01) | |
| *C08J 3/24* | (2006.01) | |
| *C08J 5/22* | (2006.01) | |
| *C08F 236/14* | (2006.01) | |
| *H01M 8/10* | (2016.01) | |

(52) U.S. Cl.
CPC ............ *H01M 8/103* (2013.01); *B01J 41/07* (2017.01); *B01J 47/12* (2013.01); *C08F 220/56* (2013.01); *C08F 236/14* (2013.01); *C08J 3/24* (2013.01); *C08J 5/2231* (2013.01); *H01M 8/1027* (2013.01); *H01M 8/1072* (2013.01); *C08F 2810/20* (2013.01); *C08J 2333/26* (2013.01); *C08J 2347/00* (2013.01); *H01M 2008/1095* (2013.01)

(58) Field of Classification Search
None
See application file for complete search history.

(56) References Cited

FOREIGN PATENT DOCUMENTS

| | | | |
|---|---|---|---|
| CN | 108579423 | * | 9/2018 |
| WO | WO 2016/127212 | * | 8/2016 |

OTHER PUBLICATIONS

"Synthesis and properties of chemically cross-linked poly(vinyl alcohol)—poly(acrylamide-co-diallyldimethylammonium chloride) (PVA-PAADDA) for anion-exchange membranes" by Qiao et al., Solid State Ionics 214 (2012) 6-12.*

* cited by examiner

*Primary Examiner* — Basia A Ridley
*Assistant Examiner* — Heng M. Chan
(74) *Attorney, Agent, or Firm* — MacMillan, Sobanski & Todd, LLC

(57) ABSTRACT

Crosslinked membranes for anion exchange applications, and methods of making and using the same, are described.

34 Claims, 6 Drawing Sheets
(3 of 6 Drawing Sheet(s) Filed in Color)

| Film ID # | %POLYMER | %GA | Molar ratio | Ratio POLY:GA Weight | CoPolymer% | HCL conc(M) | Reaction Time(min) | Reaction Temp(deg C) | Cast Temp(deg C) | Cast Speed (mm/s) | Avg THK (μm) | IEC | Avg. Water uptake |
|---|---|---|---|---|---|---|---|---|---|---|---|---|---|
| | 4 | 4 | | 1:1 | 35% | 0.05 | 6:00 | 80 | 80 | 80 | 108 | 2.3 | 275% |
| | 6 | 6 | | 1:1 | 35% | 0.05 | 6:00 | 80 | 80 | 80 | 111 | 2.7 | 229% |
| | 4 | 4 | | 1:1 | 60% | 0.05 | 6:10 | 80 | 80 | 50 | 120 | 2.3 | 251% |
| | 4 | 4 | | 1:1 | 55% | 0.05 | 6:00 | 80 | 80 | 50 | 87 | 2.1 | 150% |
| | 2 | 2 | | 1:1 | 100% | 0.05 | 10:00 | 80 | 80 | 50 | 47 | 2.1 | |
| 20180321E | 4 | 4 | | 1:1 | 70% | 0.05 | 6:30 | 80 | 80 | 50 | 71 | 1.8 | 84% |
| | 3 | 3 | | 1:1 | 63% | 0.05 | 6:15 | 80 | 80 | 50 | 53 | 1.8 | 211% |
| | 4 | 4 | | 1:1 | 75% | 0.05 | 9:00 | 80 | 80 | 100 | 105 | 1.7 | 115% |
| | 4 | 4 | | 1:1 | 80% | 0.05 | 6:45 | 80 | 80 | 50 | 102 | 1.7 | 30% |
| 20180339A | 2 | 2 | | 1:1 | 65% | 0.05 | 6:00 | 80 | 80 | 300 | 87 | 1.6 | 77% |
| | 4 | 4 | | 1:1 | 70% | 0.05 | 6:30 | 80 | 80 | 50 | 82 | 1.6 | 57% |
| | 6 | 6 | | 1:1 | 55% | 0.05 | 6:00 | 80 | 80 | 50 | 111 | 1.4 | 110% |
| | 3 | 3 | | 0.5:1 | 100% | 0.05 | 6:15 | 80 | 80 | 10 | 90 | 1.4 | 20% |
| | 6 | 6 | | 2:1 | 100% | 0.05 | 5:45 | 60 | 80 | 10 | 91 | 1.2 | 15% |
| | 2 | 2 | | 2:1 | 70% | 0.05 | 6:15 | 80 | 80 | 10 | 34 | 1.2 | 26% |
| 20180411B | 6 | 6 | | 1:3 | 51% | 0.05 | 6:30 | 80 | 80 | 50 | 101 | 1.1 | 228% |
| | 8 | 8 | | 0.5:1 | 100% | 0.05 | 5:00 | 80 | 80 | 80 | 210 | 1.0 | 45% |
| | 12 | 12 | | 0.5:1 | 100% | 0.05 | 5:13 | 80 | 80 | 5 | 81 | 1.0 | |
| 20180330B | 4 | 4 | | 1:1 | 60% | 0.05 | 6:30 | 80 | 80 | 50 | 79 | 0.9 | 45% |
| 20180226B | 6 | 6 | | 1:3 | 60% | 0.05 | 5:30 | 60 | 80 | 60 | 82 | 0.9 | 25% |
| | 5 | 5 | | 1.25:1 | 100% | 0.05 | 5:30 | 90 | 90 | 10 | 162 | 0.9 | |
| | 3 | 3 | | 1:1 | 100% | 0.05 | 6:15 | 80 | 80 | 50 | 52 | 0.8 | 18% |
| | 4 | 4 | | 1:1 | 100% | 0.05 | 10:00 | 80 | 80 | 10 | 100 | 0.8 | 12% |
| | 12 | 12 | | 0.5:1 | 100% | 0.1 | 10:00 | 80 | 80 | 10 | 350 | 0.8 | 36% |
| 20180226A | 6 | 6 | | 1:1 | 100% | 0.1 | 10:00 | 90 | 90 | 50 | 100 | 0.7 | 15% |
| | 4 | 4 | | 1.5:1 | 100% | 0.05 | 6:30 | 80 | 80 | 50 | 121 | 0.7 | 24% |
| 20180321A | 2.67 | 5.33 | | 0.5:1 | 100% | 0.05 | 5:30 | 80 | 80 | 50 | 113 | 0.7 | 26% |
| 20180322E | 2 | 4 | | 0.5:1 | 100% | 0.05 | 5:30 | 80 | 80 | 50 | 92 | 0.7 | 29% |
| 20180314C | 4 | 6 | | 0.67:1 | 100% | 0.05 | 5:30 | 80 | 80 | 50 | 58 | 0.6 | 15% |
| 20180321B | 2.29 | 5.71 | | 0.4:1 | 100% | 0.05 | 5:30 | 80 | 80 | 50 | 86 | 0.6 | 22% |
| | | | | | | | | | | | | | |
| 20180315B | 4 | 10 | | 0.4:1 | 100% | 0.05 | 5:30 | 80 | 80 | 50 | 172 | 0.5 | 46% |

FIG. 6A – Table 3, Part I

| Film ID # | %POLYMER | %GA | Molar ratio | Ratio POLY/GA CoPolymer& Weight | CoPolymer% | HCL conc(M) | Reaction Time(min) | Reaction Temp(deg C) | Cast Temp(deg C) | Cast Speed (mm/s) | Avg THK (um) | IEC | Avg. Water uptake |
|---|---|---|---|---|---|---|---|---|---|---|---|---|---|
| 20180328B | 1.6 | 6.4 | | 1:4 | 100% | 0.05 | 5:30 | | 80 | 50 | 70 | | 26% |
| 20180330C | 2 | 6 | | 1:3 | 50% | 0.05 | 5:30 | | 80 | 50 | n/a | | 23% |
| 20180328A | 2 | 6 | | 1:3 | 100% | 0.05 | 5:30 | | 80 | 50 | 87 | | |
| 20180615B | 2 | 1.43 | 1.5 | 1.4:1 | 100% | 0.05 | 5:30 | | 80 | 50 | 24 | | |
| 20180615A | 2 | 0.858 | | 2.3:1 | 100% | 0.05 | 5:30 | | 80 | 50 | 23 | | |
| 20180226D | 3 | 4 | | 0.75:1 | 100% | 0.05 | 5:20 | | 80 | 50 | n/a | | |
| | 4 | 6 | | 1:1.5 | 100% | 0.05 | 2:42 | | 80 | 10 | n/a | | |
| | 4 | 4 | | 1:1 | 100% | 0.05 | 5:16 | | 60 | 10 | n/a | | |
| | 4 | 4 | | 1:1 | 100% | 0.05 | 3:39 | | 80 | 10 | n/a | | |
| | 4 | 4 | | 1:1 | 100% | 0.05 | 3:15 | | 80 | 10 | n/a | | |
| | 4 | 2.67 | | 1.5:1 | 100% | 0.05 | 3:29 | | 80 | 10 | n/a | | |
| | 4 | 2 | | 2:1 | 100% | 0.05 | 4:12 | | 80 | 10 | n/a | | |
| | 4 | 1 | | 4:1 | 100% | 0.05 | 17:36 | | 80 | 10 | n/a | | |
| | 4 | 0.5 | | 8:1 | 100% | 0.05 | 6:55 | | 80 | 10 | n/a | | n/a |
| | 4 | 0.5 | | 8:1 | 100% | 0.05 | 5:30 | | 80 | 50 | n/a | | |
| 20180321F | 4 | 4 | | 1:1 | 50% | 0.05 | 6:00 | | 80 | 10 | n/a | | |
| | 4 | 2 | | 2:1 | 75% | 0.05 | 6:30 | | 80 | 10 | 90 | | 34% |
| | 4 | 2 | | 2:1 | 90% | 0.05 | 5:20 | | 60 | 10 | 147 | | |
| 20180905A | 4 | 4 | | 1:1 | 100% | 0.05 | 5:00 | | 72 | 50 | n/a | | |
| 20180910A | 4 | 4 | | 1:1 | 100% | 0.05 | 7:00 | | 80 | 50 | 28 | | 29% |
| 20180426A | 4 | 2 | | 2:1 | 100% | 0.05 | 6:23 | | 60 | 10 | n/a | | |
| 20180505A | 4 | 0.572 | 1:1 | -8:1 | 100% | 0.05 | 5:30 | | 80 | 50 | n/a | | |
| | 4 | 0.572 | 1:1 | -8:1 | 100% | 0.05 | 60:00 | | 95 | 10 | 37 | | |
| | 6 | 6 | | 1:1 | 100% | 0.05 | 5:02 | | 80 | 10 | n/a | | |
| | 6 | 4 | | 1:1 | 100% | 0.05 | 3:34 | | 80 | 10 | n/a | | |
| | 6 | 3 | | 10.67 | 100% | 0.05 | 3:19 | | 80 | 10 | n/a | | |
| | 6 | 3 | | 2:1 | 100% | 0.05 | 4:04 | | 80 | 10 | n/a | | |
| | 6 | 2 | | 3:1 | 100% | 0.05 | 4:12 | | 80 | 10 | n/a | | |
| | 6 | 1.5 | | 4:1 | 100% | 0.05 | 3:32 | | 80 | 10 | n/a | | |
| | 6 | 6 | | 1:1 | 100% | 0.05 | 3:46 | | 80 | 10 | 337 | | 32% |
| | | | | | | 0.05 | 10:00 | | 90 | 10 | | | |

FIG. 6B – Table 3, Part II

FIG. 6C – Table 3, Part III

CROSSLINKED MEMBRANE FOR ANION EXCHANGE APPLICATIONS

RELATED APPLICATIONS

This application claims priority to U.S. Provisional Application No. 62/743,724 filed under 35 U.S.C. § 111(b) on Oct. 10, 2018, the disclosure of which is incorporated herein by reference in its entirety.

STATEMENT REGARDING FEDERALLY SPONSORED RESEARCH

This invention was made with government support under Grant Number W911NF-17-1-0362 awarded by the Army Research Office. The government has certain rights in this invention.

BACKGROUND OF THE INVENTION

Most known anion exchange membranes involve custom polymer synthesis in very small batches (such as less than 10 g or 1 g), where scale-up of syntheses can take years to reach kilogram scale. This is slow and costly. Known anion exchange membranes also commonly suffer from limited processability, the use of potentially hazardous organic solvents, mechanically weak or poor durability, and the addition of custom cations with variable stability. Cations of many types have been proposed for AEMs. Many include effective and stable, but rare, materials such as ruthenium, while others are difficult to synthesize or attached to polymers (e.g., sulfonium or phosphonium).

A number of random and diblock copolymer have been synthesized and converted into anion exchange membranes, and different cations and crosslinking methods have been used on anion exchange membranes. Some problems with these have included the shortcomings of solvent casting, such as limited solubility for copolymers—usually organic and sometimes hazardous—and a limited understanding of the solution properties (e.g., viscosity-concentration relationship to cast film thickness). For example, xylene may be used as a solvent to produce thin and mechanically robust films, but produces films having only modest conductivity.

There is a need for new anion exchange membranes.

SUMMARY

Provided is a water insoluble membrane comprising a polymer composition comprising poly(acrylamide-co-diallyldimethylammonium chloride) (PAAcDADMAC) crosslinked with a water soluble crosslinker. In certain embodiments, the water soluble crosslinker comprises glutaraldehyde.

In certain embodiments, the membrane has an ion exchange capacity in the range of from about 0.5 to about 9.3. In certain embodiments, the membrane has an ion exchange capacity of from about 0.7 to about 2.7. In certain embodiments, the membrane has an ion exchange capacity of from about 1.4 to about 1.5.

In certain embodiments, the membrane has an area of greater than about 200 cm$^2$. In certain embodiments, the membrane has an area of greater than about 100 cm$^2$.

In certain embodiments, the membrane comprises the PAAcDADMAC and the crosslinker at a PAAcDADMAC:crosslinker ratio of from about 8:1 by weight to about 1:3 by weight. In certain embodiments, the membrane comprises the PAAcDADMAC and the crosslinker at a PAAcDADMAC:crosslinker ratio of about 1:1 by weight. In certain embodiments, the membrane comprises the PAAcDADMAC and the crosslinker at a PAAcDADMAC:crosslinker ratio of about 0.5:1 by weight. In certain embodiments, the membrane comprises the PAAcDADMAC and the crosslinker at a PAAcDADMAC:crosslinker ratio of about 2:1 by weight. In certain embodiments, the membrane comprises the PAAcDADMAC and the crosslinker at a PAAcDADMAC:crosslinker ratio of about 1:3 by weight.

In certain embodiments, the membrane has a water uptake ranging from about 10% to about 410%. In certain embodiments, the membrane has a water uptake ranging from about 15% to about 300%.

In certain embodiments, the polymer composition further comprises an additional, uncrosslinked polymer. In particular embodiments, the additional, uncrosslinked polymer comprises poly(diallyldimethylammonium chloride) (PDADMAC). In particular embodiments, the additional, uncrosslinked polymer is present in an amount ranging from about 10% by weight of the total polymer to about 70% by weight of the total polymer. In particular embodiments, the additional, uncrosslinked polymer is present in an amount ranging from about 35% by weight of the total polymer to about 90% by weight of the total polymer.

In certain embodiments, the membrane has a thickness ranging from about 20 µm to about 150 µm, an ion exchange capacity (IEC) of from about 0.7 to about 2.7, and an average water uptake of at least about 10%.

Further provided is a fuel cell comprising a solid electrolyte comprising the water insoluble membrane described herein.

Further provided is a polymer composition comprising poly(acrylamide-co-diallyldimethylammonium chloride) (PAAcDADMAC) crosslinked with a water soluble crosslinker. In certain embodiments, the water soluble crosslinker comprises glutaraldehyde. In certain embodiments, the polymer composition further comprises uncrosslinked poly(diallyldimethylammonium chloride) (PDADMAC). In certain embodiments, the polymer composition further comprises an acid.

Further provided is a method of producing a membrane, the method comprising combining a water soluble polymer with a water soluble crosslinker to produce a reaction mixture; allowing the reaction mixture to react for a period of time to produce a polymer composition comprising a crosslinked polymer; and casting the polymer composition into a membrane; wherein the period of time is at least one minute.

In certain embodiments, the water soluble crosslinker comprises glutaraldehyde. In certain embodiments, the water soluble polymer comprises poly(acrylamide-co-diallyldimethylammonium chloride) (PAAcDADMAC).

In certain embodiments, the reaction is allowed to react at a temperature ranging from about 60° C. to about 90° C.

In certain embodiments, the period of time ranges from about 1 minute to about 24 hours. In certain embodiments, the period of time ranges from about 3 minutes to about 10 minutes.

In certain embodiments, the casting is conducted at a temperature ranging from about 20° C. to about 95° C.

In certain embodiments, the polymer composition comprises an additional, uncrosslinked polymer.

Further provided is a method of operating a fuel cell, the method comprising employing an anion exchange membrane as a solid electrolyte in the fuel cell, wherein the anion exchange membrane comprises poly(acrylamide-co-diallyldimethylammonium chloride) (PAAcDADMAC) crosslinked with glutaraldehyde.

Further provided is a kit for preparing an ion exchange membrane, the kit comprising a first container housing poly(acrylamide-co-diallyldimethylammonium chloride) (PAAcDADMAC); and a second container housing a water soluble crosslinker.

BRIEF DESCRIPTION OF THE DRAWINGS

The patent or application file may contain one or more drawings executed in color and/or one or more photographs. Copies of this patent or patent application publication with color drawing(s) and/or photograph(s) will be provided by the U.S. Patent and Trademark Office upon request and payment of the necessary fees.

FIGS. 6A-6C: Table 3, displaying characteristics of over 100 example films, shown in three parts.

DETAILED DESCRIPTION

Throughout this disclosure, various publications, patents, and published patent specifications may be referenced by an identifying citation. The disclosures of these publications, patents, and published patent specifications are hereby incorporated by reference into the present disclosure in their entirety to more fully describe the state of the art to which this invention pertains.

Provided is a composition comprising one or two water soluble polymers that are chemically crosslinked to create a free-standing membrane that can provide ionic conductivity to fuel cells or other electrochemical devices.

Poly(acrylamide-co-diallyldimethylammonium chloride) (PAAcDADMAC) is a water soluble co-polymer having the following structural formula, Formula I:

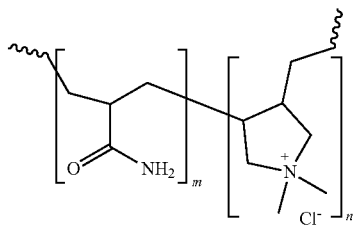

Figure 1A:
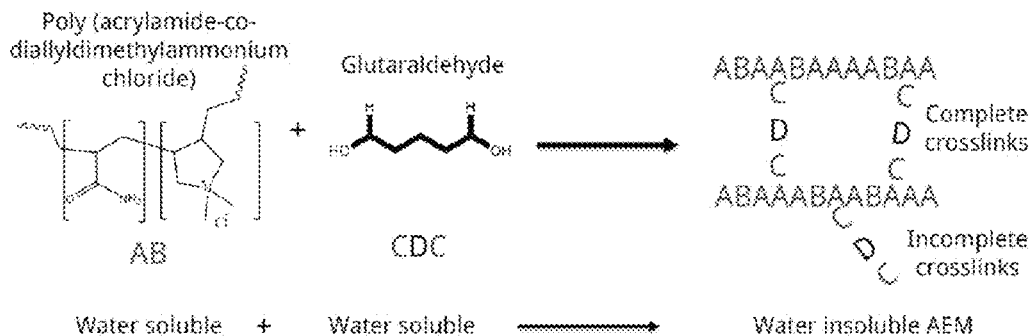
FIGS. 1A-1B: Crosslinking of PAAcDADMAC polymer with glutaraldehyde (GA) crosslinker to produce a water insoluble product of crosslinked poly(acrylamide-co-diallyldimethylammonium chloride) (PAADMAC/GA).
Figure 1B:
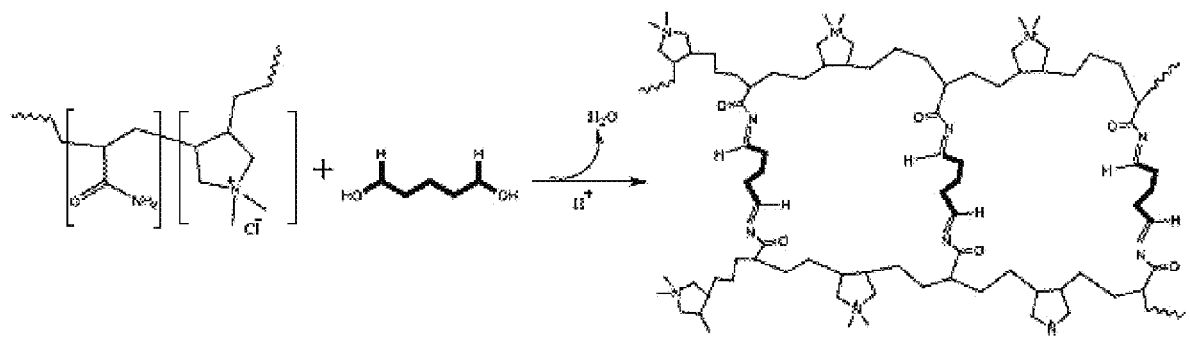

Formula I where n and m are each integers greater than 1. In accordance with the present disclosure, PAAcDADMAC may be crosslinked with a water soluble crosslinker, such as glutaraldehyde, to form a polymer composition which may be cast into a water insoluble membrane, which may also be referred to herein as an anion exchange membrane (AEM) or a film. This process is illustrated in FIGS. 1A-1B, in which the comonomers of PAAcDADMAC are labeled with a red "A" for acrylamide and a blue "B" for diallyldimethylammonium chloride. As depicted in FIG. 1A, the crosslinked polymer composition may include complete crosslinks and also incomplete crosslinks.

The PAAcDADMAC may be present in an amount ranging from about 1% by weight to about 10% by weight, or from about 2% by weight to about 6% by weight. In some non-limiting examples, the PAAcDADMAC polymer is used in an amount of about 2% by weight, about 4% by weight, or about 6% by weight. The crosslinker may be present in an amount ranging from about 0.3% by weight to about 15% by weight, or from about 0.5% by weight to about 12% by weight. In some non-limiting examples, the crosslinker is used in an amount of about 4% by weight, about 6% by weight, or about 12% by weight.

The polymer composition may be composed of 100% PAAcDADMAC copolymer. Alternatively, in some embodiments, an additional, uncrosslinked polymer is added to form the polymer composition which is cast into the insoluble membrane. In such cases, the polymer composition may be composed of from about 35% to about 90% crosslinked PAAcDADMAC copolymer (based on the total weight of the polymer composition), and from about 10% to about 70% additional, uncrosslinked polymer (based on the total weight of the polymer composition). A non-limiting example of a suitable polymer for the additional, uncrosslinked polymer is poly(diallyldimethylammonium chloride) (PDADMAC), though other water soluble polymers are possible. PDADMAC has the structural formula of Formula II:

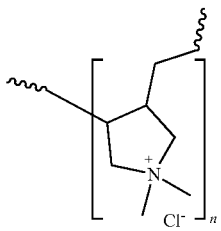

Formula II where n is an integer greater than 1.

Although glutaraldehyde is described for exemplary purposes, other crosslinkers may be used. For example, any water soluble crosslinker capable of crosslinking acrylamide may be used to crosslink PAAcDADMAC. Non-limiting examples include glutaraldehyde, N,N'-methylenebisacrylamide, and combinations thereof. The weight ratio of polymer to crosslinker may range from about 0.5:1 to about 8.1. In some non-limiting examples, the weight ratio of polymer to crosslinker is about 1:1, about 1:3, about 1.25:1, about 0.4:1, or about 0.5:1.

The method of forming the membranes described herein may involve green, solvent-free processing of commercially available polymers to create functional polymer films. To create a water insoluble membrane from PAAcDADMAC and a water soluble crosslinker, the PAAcDADMAC and the crosslinker may be mixed together and allowed to react, with or without stirring, for a period of time before casting the polymer composition into a membrane. The period of time is generally at least one minute. If the reaction is not allowed to react for this period of time before casting, the result may be a gel instead of a membrane. If stirring the reaction, the composition may be cast once the stirring has noticeably slowed. The period of time may range from about 2 minutes to about 24 hours, or from about 3 minutes to about 30 minutes, or from about 4 minutes to about 8 minutes. However, it is understood that the period of time depends on factors such as the ratio of polymer to crosslinker present in the reaction mixture. Notably, it is not necessary that the crosslinking be complete; in other words, the polymer composition which results from the reaction with the crosslinker may have dangling ends or incomplete crosslinks (as depicted in FIG. 1A), and such a composition may nonetheless be cast into a membrane and suitable for use in ion exchange applications. With an increase in the ratio of polymer to crosslinker, the period of time for reaction before casting is generally increased.

In general, the reaction temperature may be higher than temperatures at which acrylamide is conventionally crosslinked. The reaction may be conducted at a temperature ranging from about 60° C. to about 90° C.

Acid may be present in the reaction mixture, such as HCl in a concentration ranging from about 0.05 M to about 0.1 M. As a result, the pH of the reaction mixture may be in the range of from about 2 to about 4. However, the acid is generally rinsed out once the film is produced.

Figure 2:
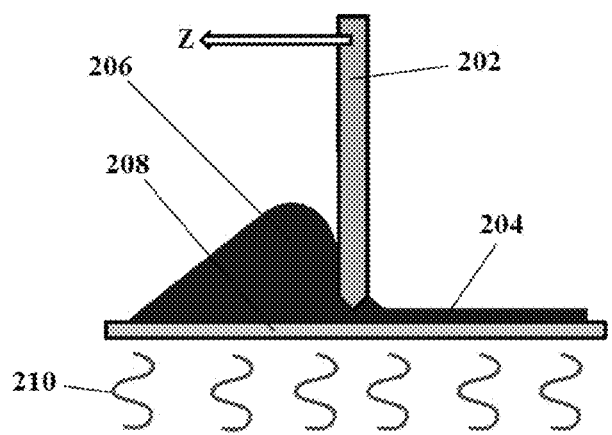
FIG. 2: Illustration of a process for making membranes.

After the period of time for the reaction, the composition may be cast into a membrane. FIG. 2 illustrates a process for preparing the membranes. Referring to FIG. 2, a polymer solution 206 may be deposited on a substrate 208 as a wet film 204, and heat 210 may be applied as a coating blade 202 casts the membrane by moving along the wet film 204 in the direction Z. The casting may be conducted at a temperature ranging from about 20° C. to about 90° C. The cast speed (i.e., the speed of the coating blade 202 along the wet film 204) may range from about 5 mm/s to about 500 mm/s.

Figure 5:
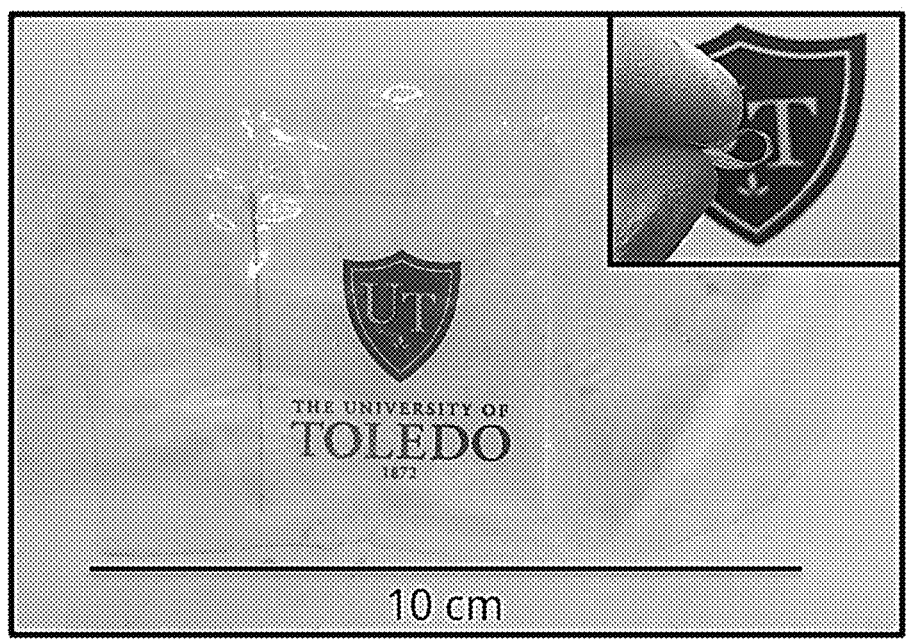
FIG. 5: Color photograph of an example film of PAAcDADMAC crosslinked with glutaraldehyde. The example film depicted had a size of about 80 cm² and a thickness of 31 μm. The inset shows the flexibility of the dry film.

Solvent casting has been used to create films over 100 cm$^2$ in size with a thickness below 30 µm. The process produces functional, hydrated films. Large, thin anion exchange membranes having desirable conductivity have been created from the crosslinked composition described herein. After crosslinking, films with titrated ion exchange capacity (IEC) values from 0.7 to 2.7, and higher, have been synthesized with over 200 cm$^2$ area per film. The films may have a large area (i.e., over 200 cm$^2$ per film), may have modest water uptake ranging from about 15% to about 410%, and may be made as thin as about 20 µm. There is no particular limit on the size of the films that can be produced. The films are also chemically and mechanically stable. The copolymer incorporates a N,N-dimethylpyrrolidinium (DMPy) cation, which has already been demonstrated to be stable under high pH conditions. The films may also be substantially transparent (as seen in FIG. 5), making them useful in certain applications which may require a transparent conductive film, such as photovoltaic devices.

Advantageously, the starting copolymer is an industrially used material available in kilogram quantities at low cost (less than $0.10 per g). Custom polymer synthesis for AEMs conventionally focuses on low polydispersity polymers, which normally limits molecular weight. However, high molecular weight materials may be used to create large scale, functional products. PAAcDADMAC has a higher molecular weight (more than 1 M Da) than conventional anion exchange membranes. Higher molecular weight and higher polydispersity generally lead to stronger and more elastic films, especially under saturated hymidity conditions. So, more mechanically robust polymer films are possible.

PAAcDADMAC is conventionally used for water-based, liquid-phase personal care products, and therefore not known to be crosslinked to create a water-insoluble product.

Figure 3:
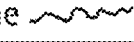
FIG. 3: Schematics of crosslinked polymer membranes cast from dilute solutions and cast from entangled solutions, and example properties thereof.

The crosslinking chemistry combines the water soluble copolymer poly(acrylamide-co-diallyldimethylammonium chloride) (PAAcDADMAC) and water insoluble crosslinker (e.g., glutaraldehyde) in a water-based process. Combining a copolymer and crosslinker with water-based processing allows for the production of functional, hydrated polymer films. Without wishing to be bound by theory, it is believed that the crosslinks improve mechanical properties more than entanglements (see FIG. 3), and that crosslinks create interconnected water channels—which improve conductivity—by limiting rearrangement of polymer chains. FIG. 3 shows some property differences between films produced from dilute solutions and films produced from entangled solutions. As seen in FIG. 3, without crosslinks, the films may dissolve in water, have an IEC greater than or equal to 2.4, and have poor mechanical properties. However, with crosslinks, the IEC may be in a range of from 1 to 2, and the films may have good water uptake and good mechanical properties.

The kinetics of crosslinking are important for forming a water-insoluble film. Casting a film before enough crosslinks have formed leads to a partially water-soluble membrane, while allowing crosslinking to complete creates a gel that cannot be cast into a thin membrane. Therefore, the reaction mixture should be allowed to react for a period of time before being cast into a membrane, but should not be allowed to react long enough that the resulting membrane would be undesirably thick.

The use of crosslinks overcomes the shortcomings known in the art by allowing for a synthesis from kilograms of starting polymer, the use of water as a solvent instead of organic solvents, high molecular weight polymers replacing lower molecular weight polymers, and a stable cation already existing within the backbone of the polymer.

The films described herein may further include one or more additives, such as valeraldehyde to manage the water uptake/hydrophobicity of the film, or dyes or colorants to change the color of the film.

Various properties of the films are tailorable based on the concentrations of the polymer and the crosslinker, the concentration ratio of polymer to crosslinker, and the amount of time the reaction is allowed to react before casting the membrane from the reaction mixture. For example, the IEC of the film may be tuned by the concentrations of the polymer and the crosslinker. In general, with more crosslinker added, the IEC decreases. This can be seen, for instance, in FIGS. 6A-6C (displaying characteristics of example films produced as described in the examples herein), which shows that IEC generally decreases as the weight ratio of polymer to crosslinker decreases. An IEC in the range of from about 1.4 to about 1.5 is typical for an AEM used in a fuel cell. As seen from FIGS. 6A-6C, an IEC in this range can be achieved, for instance, using a weight ratio of polymer to crosslinker of about 0.5:1, with 55% by weight of the polymer composition being the crosslinked PAAcDADMAC copolymer and the remainder being uncrosslinked PDADMAC, a reaction time of about 6:00, a reaction temperature of about 80° C., a cast temperature of about 80° C., and a cast speed of about 10 mm/s. As another example, an IEC in this range can be achieved using a weight ratio of polymer to crosslinker of about 2:1, with 100% of the polymer composition being the crosslinked PAAcDADMAC copolymer, a reaction time of about 5:45, a reaction temperature of about 60° C., a cast temperature of about 60° C., and a cast speed of about 10 mm/s.

Figure 6C:
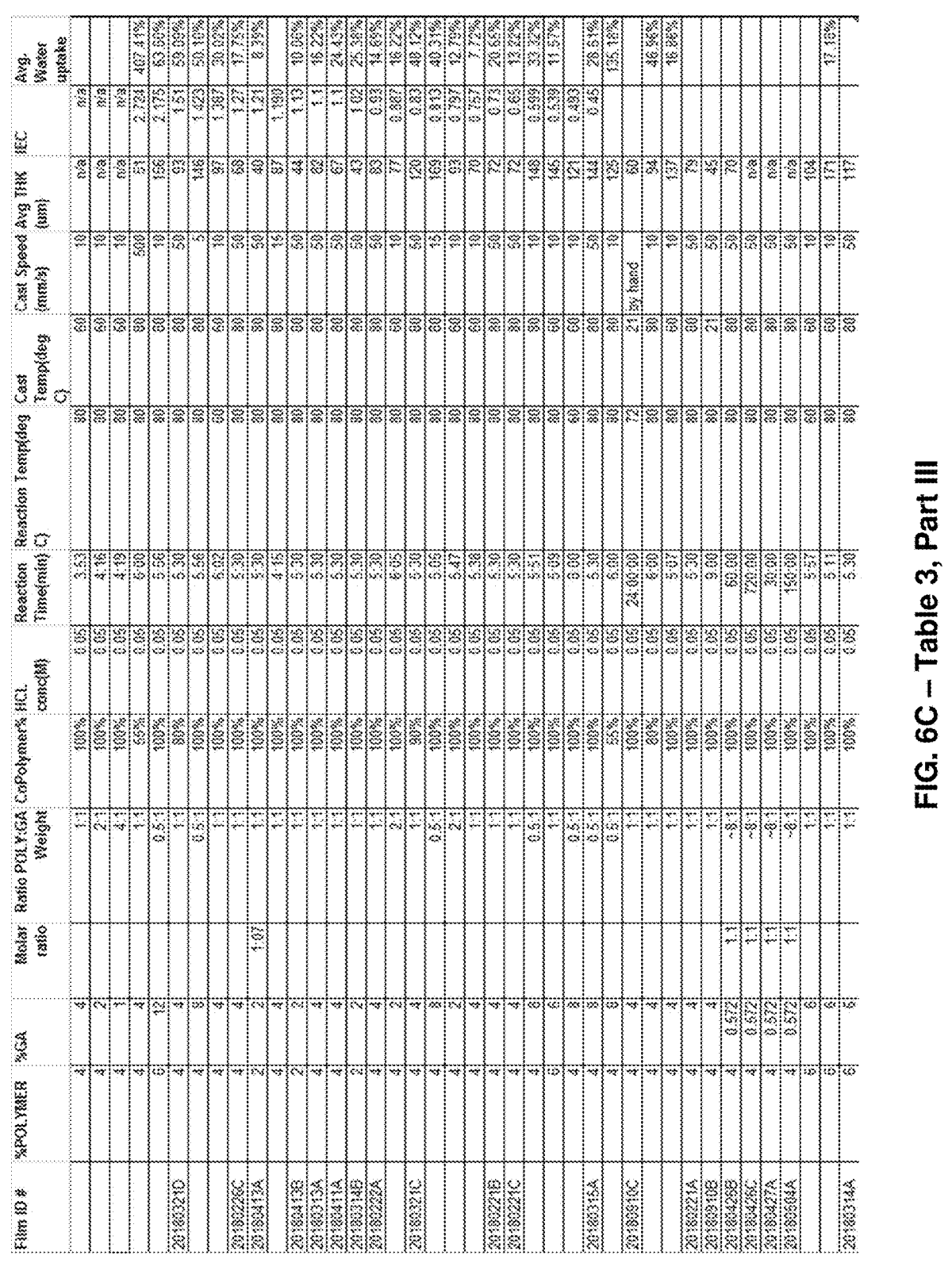

Furthermore, an increase in the presence of uncrosslinked additional polymer tends to increase the IEC of the film. As seen in FIGS. 6A-6C, the film with the highest IEC was made from a polymer composition having 35% by weight of the crosslinked PAAcDADMAC copolymer, with the remainder of the polymer composition being uncrosslinked PDADMAC.

The thickness of the membrane can be adjusted by altering the polymer concentration or altering the temperature of the casting. As seen from FIGS. 6A-6C, a lower casting temperature generally produces a smaller thickness, and a lower polymer concentration generally produces a smaller thickness.

The films described herein are useful as solid electrolytes, such as in membrane-based fuel cells. Thus, provided are membrane-based fuel cells comprising an anion exchange membrane composed of a film of PAAcDADMAC crosslinked with a water soluble crosslinker such as glutaraldehyde, and optionally further comprising an additional, uncrosslinked polymer such as PDADMAC. Membrane-based fuel cells convert chemical energy into electrical energy, may involve no moving parts, may give off low emissions, may give off green byproducts, and may have an efficiency greater than that of internal combustion engines. Membrane-based fuel cells may also use a variety of abundant fuels, such as, but not limited to, $H_2$, $CH_3OH$, or $C_2H_5OH$.

Figure 4:
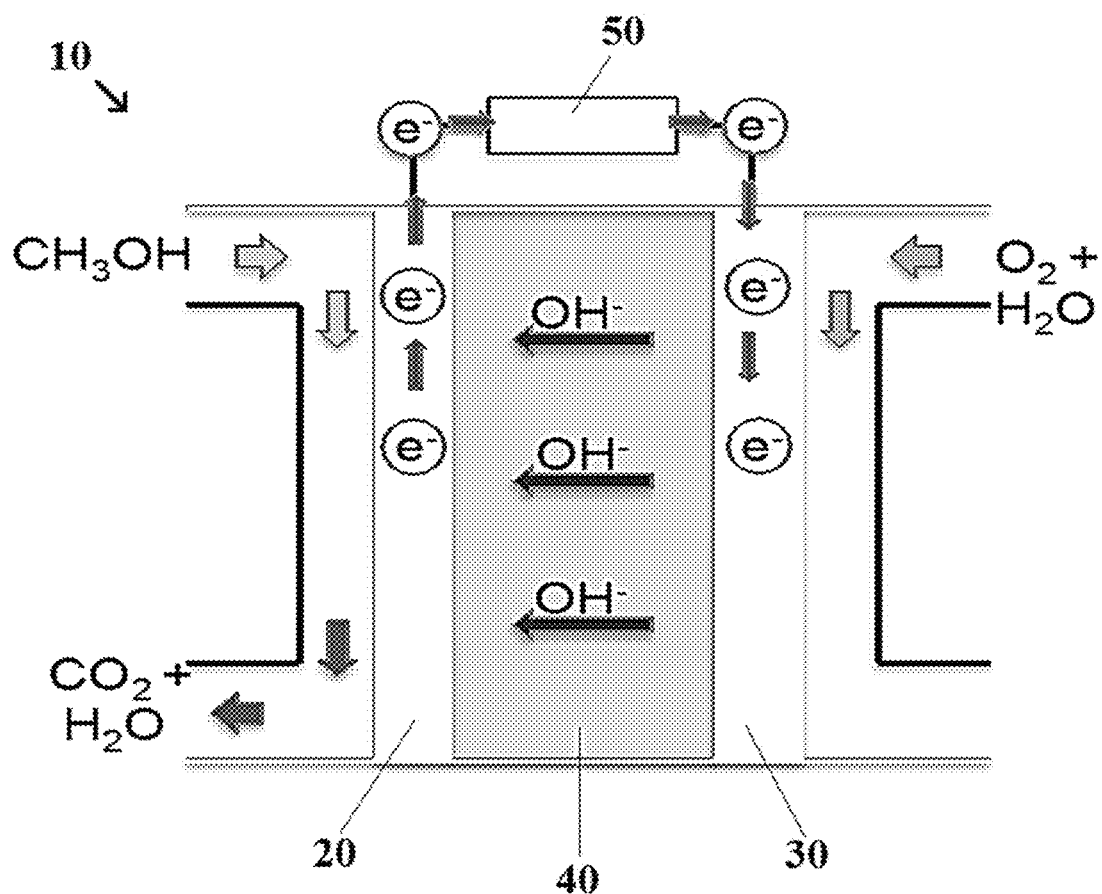
FIG. 4: Schematic illustration of an alkali anion exchange membrane fuel cell.

FIG. 4 schematically depicts an alkali anion exchange membrane fuel cell as an example solid polymer electrolyte membrane fuel cell, in which the solid polymer electrolyte membrane transports anions. Referring to FIG. 4, an anion exchange fuel cell 10 may include an anode 20, a cathode 30, and a solid polymer electrolyte 40 configured to transport anions such as $OH^-$ from the cathode 30 to the anode 20. The solid polymer electrolyte 40 may be a membrane comprising a film of PAAcDADMAC crosslinked with a water soluble crosslinker such as glutaraldehyde, and optionally further comprising an additional, uncrosslinked polymer such as PDADMAC.

The solid polymer electrolyte 40 transports alkaline anions, such as $OH^-$, between the cathode 30 and the anode 20. The fuel, such as $CH_3OH$, is supplied to the anode 20, and oxygen and water are supplied to the cathode 30. The fuel is oxidized at the anode 20, and oxygen is reduced at the cathode 30. At the cathode 30, the oxygen reduction produces $OH^-$ ions that travel through the electrolyte 40 to the anode 20. At the anode 20, the $OH^-$ ions react with the fuel to produce water and electrons. The electrons flow through the circuit 50, producing current to perform electrical work. The anion exchange fuel cell 10 may be used for transportation (e.g., light-utility vehicles, buses, etc.), stationary applications such as heating, portable applications such as electronics and communications, or the like.

Anion exchange membrane fuel cells have various advantages over proton exchange fuel cells, such as increased kinetics of alkali media, non-Pt-based catalysts, and a reduction in methanol crossover. However, conventional anion exchange membrane fuel cells may have lower ionic conductivity than proton exchange membrane fuel cells, and may conventionally have issues with chemical and mechanical stability. The stability of nitrogen containing cations has conventionally been a concern. However, in the present disclosure, the nitrogen containing cation in PAAcDADMAC is used without stability issues. Advantageously, an anion exchange membrane fuel cell with an ion exchange membrane as described herein may have chemical and mechanical stability. Furthermore, an anion exchange membrane suitable for use in an anion exchange membrane fuel cell should have a high ionic conductivity, selective permeability to ions in order to prevent fuel/air crossover, adequate water sorption without significant dimensional swelling, chemical stability, and mechanical stability. The films described herein may meet these needs.

As non-limiting examples of other ion exchange applications, the films described herein may also be used for desalination or other water systems which utilize ion exchange membranes.

It is further envisioned that the membranes, compositions, and methods described herein may be embodied in the form of a kit or kits. A non-limiting example of such a kit may be a kit for preparing an ion exchange membrane, and may include a first container housing poly(acrylamide-co-diallyldimethylammonium chloride) (PAAcDADMAC), and a second container housing a water soluble crosslinker, where the containers may be present in a combined configuration or package. Many other kits are possible. The kits may further include instructions for using the components of the kit to practice the subject methods. The instructions for practicing the subject methods are generally recorded on a suitable recording medium. For example, the instructions may be present in the kits as a package insert or in the labeling of the container of the kit or components thereof. In other embodiments, the instructions are present as an electronic storage data file present on a suitable computer readable storage medium, such as a flash drive. In other embodiments, the actual instructions are not present in the kit, but means for obtaining the instructions from a remote source, such as via the internet, are provided. An example of this embodiment is a kit that includes a web address where the instructions can be viewed and/or from which the instructions can be downloaded. As with the instructions, this means for obtaining the instructions is recorded on a suitable substrate.

EXAMPLES

Materials and Methods

Low molecular weight poly (acrylamide-co-diallyldimethylammonium chloride) copolymer (LMW-PAAcP-DAMAC), glutaraldehyde (GA), and hydrochloric acid (HCl) were purchased from Sigma Aldrich and used without additional treatment. High molecular weight PAAcP-DAMAC with the trade name of Merquat™ 2200 (MQ2200) was obtained from Lubrizol Advanced Materials Inc, OH, US. The LMW-PAAcPDAMAC was in the form of a viscous solution of 10 weight percent in water with a composition of about 55 weight percent acrylamide. The MQ2200 came in powder form so solutions of different concentrations were prepared by stirring the polymer in DI water over night. The GA was a liquid solution composed of 50 weight percent concentration in water.

Preparing crosslinked PAAcPDAMAC-GA membranes involved several steps. First, PAAcPDAMAC aqueous solutions of different concentrations were prepared by dissolving the pre-weighed amount of co-polymer in water at room temperature followed by stirring in flat bottom flask for to obtain a clear solution. GA solution was then diluted to the target concentration and added gradually to the PAAcP-DAMAC beaker within a controlled temperature oil bath between 60-90° C. followed by subsequent addition of HCl (0.05 to 0.5 M) to initiate the reaction. The mixing was then monitored by eye for the onset of visible increased viscosity of the mixture (1-10 mins in most cases, and up to 24 hours). The warm solution was poured onto a glass substrate and drawn across the substrate with a micrometer adjustable film applicator. The film applicator was drawn at a speed ranging from 10-50 mm/s using a film coater (MTI Corporation's MSK-AFA-III, Richmond, Calif.). The solution was allowed to evaporate overnight, after which edges of the dried polymer film was soaked and were peeled off the plate using a razor blade until the film released. The gap height of the micrometer adjustable film applicator was used to control film thickness and consistency. Blade heights ranged from 100 to 1000 microns and final film thickness ranged from 20 to 130 microns. Synthesized films were rinsed by soaking in water to remove unreacted glutaraldehyde and hydrochloric acid from the film. Films were eventually soaked in 1 M NaCl to convert into chloride form. Films were stored in bags with a small amount of water due to their brittleness when dry.

A humidity-controlled oven was used for mechanical testing of the films at a full range of humidity, and the stress due to cycling relative humidity could be quantified over 100 cycles or more.

| Component | Unit | Low | High |
|---|---|---|---|
| Total polymer concentration | wt % | 1.6 | 6 |
| GA concentration | wt % | 0.5 | 12 |
| Copolymer:PDADMAC mixtures fraction of PDADMAC | % | 0 | 65 |
| HCl Concentration | M | 0.05 | 0.1 |
| Reaction Time | h:m:s | 0:03:19 | 24:00:00 |
| Reaction Temperature | ° C. | 20 | 80 |
| Cast Temperature | ° C. | 20 | 95 |
| Cast Speed | mm/s | 5 | 500 |

Results

The films have a large area (>200 cm$^2$ per film), have a modest water uptake, and have been made as thin as 31 μm. Over 100 films, each having a size ranging from 50 cm$^2$ to 250 cm$^2$, were created by crosslinking PAAcDADMAC with glutaraldehyde. FIG. 5 shows a photograph of an example ~80 cm$^2$ film. As seen in the inset FIG. 5, the films are flexible enough to be folded over without breaking.

The water uptake ranged from about 10% to about 200%, though some films with water uptakes outside this range were produced. The IEC generally ranged from about 0.5 to about 3, though some films with IECs outside this range were produced. The membrane thickness ranged from about 15 μm to about 150 μm, though some films with thicknesses outside this range were produced. Table 2 below lists some examples of the large area films created.

TABLE 2

Large area films

| Film | Titrated IEC (mmol/g) | Film area (cm$^2$) | Film thickness (μm) | Water uptake (%) | Conductivity (mS/cm) 80° C. 95% RH |
|---|---|---|---|---|---|
| A | 0.7 | 20 | 50 | 1.1 | 11 |
| B | 1.1 | 260 | 82 | 16 | |
| C | 1.2 | 240 | 34 | 26 | |
| D | 1.5 | 200 | 93 | 59 | |
| E | 2.7 | 160 | 51 | 407 | |

FIGS. 6A-6C show Table 3, in three parts, which displays various characteristics of 107 example films produced. As seen from FIGS. 6A-6C, the increase of crosslinker concentration strongly affects the conductivity and water uptake, which were reduced substantially as the crosslinker concentrations increased. Also as seen in FIGS. 6A-6C, films having IEC values of from about 1.4 to about 1.5 were produced, making them advantageous for use in anion exchange applications.

Certain embodiments of the membranes, compositions, and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the compositions and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A water insoluble membrane comprising a polymer composition consisting of poly(acrylamide-co-diallyldimethylammonium chloride) (PAAcDADMAC) crosslinked with a water soluble crosslinker, wherein the polymer composition is a free-standing membrane.

2. The membrane of claim 1, wherein the water soluble crosslinker comprises glutaraldehyde.

3. The membrane of claim 1, wherein the membrane has an ion exchange capacity in the range of from about 0.5 to about 9.3.

4. The membrane of claim 1, wherein the membrane has an ion exchange capacity in the range of from about 0.7 to about 2.7.

5. The membrane of claim 1, wherein the membrane has an ion exchange capacity in the range from about 1.4 to about 1.5.

6. The membrane of claim 1, wherein the membrane has an area of greater than about 200 cm$^2$.

7. The membrane of claim 1, wherein the membrane has an area of greater than about 100 cm$^3$.

8. The membrane of claim 1, comprising the PAAcDADMAC and the crosslinker at a PAAcDADMAC:crosslinker ratio of from about 8:1 by weight to about 1:3 by weight.

9. The membrane of claim 1, comprising the PAAcDADMAC and the crosslinker at a PAAcDADMAC:crosslinker ratio of about 1:1 by weight.

10. The membrane of claim 1, comprising the PAAcDADMAC and the crosslinker at a PAAcDADMAC:crosslinker ratio of about 0.5:1 by weight.

11. The membrane of claim 1, comprising the PAAcDADMAC and the crosslinker at a PAAcDADMAC:crosslinker ratio of about 2:1 by weight.

12. The membrane of claim 1, comprising the PAAcDADMAC and the crosslinker at a PAAcDADMAC:crosslinker ratio of about 1:3 by weight.

13. The membrane of claim 1, wherein the membrane has a water uptake ranging from about 10% to about 410%.

14. The membrane of claim 1, wherein the membrane has a water uptake ranging from about 15% to about 300%.

15. The membrane of claim 1, wherein the membrane has a thickness ranging from about 20 μm to about 150 μm, an ion exchange capacity (IEC) of from about 0.7 to about 2.7, and an average water uptake of at least about 10%.

16. An electrochemical device comprising a solid electrolyte comprising the water insoluble membrane of claim 1.

17. A method of operating a fuel cell, the method comprising employing an anion exchange membrane as a solid electrolyte in the fuel cell,
wherein the anion exchange membrane comprises the water insoluble membrane of claim 1.

18. A water insoluble membrane comprising a polymer composition comprising poly(acrylamide-co-diallyldimethylammonium chloride) (PAAcDADMAC) crosslinked with a water soluble crosslinker;
wherein the polymer composition further comprises an additional, uncrosslinked polymer; and
wherein the additional, uncrosslinked polymer comprises poly(diallyldimethylammonium chloride) (PDADMAC).

19. A water insoluble membrane comprising a polymer composition comprising poly(acrylamide-co-diallyldimethylammonium chloride) (PAAcDADMAC) crosslinked with a water soluble crosslinker;
wherein the polymer composition further comprises an additional, uncrosslinked polymer; and
wherein the additional, uncrosslinked polymer is present in an amount ranging from about 10% by weight of the total polymer composition to about 70% by weight of the total polymer composition.

20. A water insoluble membrane comprising a polymer composition comprising poly(acrylamide-co-diallyldimethylammonium chloride) (PAAcDADMAC) crosslinked with a water soluble crosslinker;
wherein the polymer composition further comprises an additional, uncrosslinked polymer; and
wherein the additional, uncrosslinked polymer is present in an amount ranging from about 35% by weight of the total polymer composition to about 90% by weight of the total polymer composition.

21. A polymer composition comprising poly(acrylamide-co-diallyldimethylammonium chloride) (PAAcDADMAC) crosslinked with a water soluble crosslinker;
wherein the polymer composition comprises crosslinked PAAcDADMAC copolymer in an amount of at least about 35% by weight of the polymer composition; and
wherein the polymer composition is a free-standing membrane.

22. The polymer composition of claim 21, wherein the water soluble crosslinker comprises glutaraldehyde.

23. The polymer composition of claim 21, further comprising an acid.

24. An electrochemical device comprising a solid electrolyte comprising a water insoluble membrane comprising the polymer composition of claim 21.

25. The polymer composition of claim 21, wherein the free-standing membrane has an ion exchange capacity in the range of from about 0.5 to about 9.3.

26. The polymer composition of claim 21, wherein the free-standing membrane has an area of greater than about 100 cm$^2$.

27. A polymer composition comprising poly(acrylamide-co-diallyldimethylammonium chloride) (PAAcDADMAC) crosslinked with a water soluble crosslinker, and further comprising uncrosslinked poly(diallyldimethylammonium chloride) (PDADMAC).

28. A method of producing a membrane, the method comprising:
combining a water soluble polymer with a water soluble crosslinker to produce a reaction mixture;
allowing the reaction mixture to react for a period of time to produce a polymer composition comprising a crosslinked polymer; and
casting the polymer composition into a free-standing membrane;
wherein the period of time is at least one minute;
wherein the water soluble polymer comprises poly(acrylamide-co-diallyldimethylammonium chloride) (PAAcDADMAC); and
wherein the polymer composition comprises crosslinked PAAcDADMAC copolymer in an amount of at least about 35% by weight of the polymer composition.

29. The method of claim 28, wherein the water soluble crosslinker comprises glutaraldehyde.

30. The method of claim 28, wherein the reaction is allowed to react at a temperature ranging from about 60° C. to about 90° C.

31. The method of claim 28, wherein the period of time ranges from about 1 minute to about 24 hours.

32. The method of claim 28, wherein the period of time ranges from about 3 minutes to about 10 minutes.

33. The method of claim 28, wherein the casting is conducted at a temperature ranging from about 20° C. to about 95° C.

34. The method of claim 28, wherein the polymer composition comprises an additional, uncrosslinked polymer.

* * * * *

UNITED STATES PATENT AND TRADEMARK OFFICE
CERTIFICATE OF CORRECTION

PATENT NO. : 11,600,837 B2
APPLICATION NO. : 16/595871
DATED : March 7, 2023
INVENTOR(S) : Matthew Liberatore, George Amobi Ozioko and Karl Schoeps It is certified that error appears in the above-identified patent and that said Letters Patent is hereby corrected as shown below:

In the Claims

Column 10, Claim 7, Line 43-44 please correct:
"The membrane of claim 1, wherein the membrane has as area of greater than about 100 $cm^3$."
To:
--The membrane of claim 1, wherein the membrane has as area of greater than about 100 $cm^2$.--

Signed and Sealed this
Sixteenth Day of May, 2023

*Katherine Kelly Vidal*

Katherine Kelly Vidal
*Director of the United States Patent and Trademark Office*